United States Patent
Stephenson et al.

(10) Patent No.: US 11,370,959 B2
(45) Date of Patent: Jun. 28, 2022

(54) USE OF LIQUID NATURAL GAS FOR WELL TREATMENT OPERATIONS

(71) Applicant: Halliburton Energy Services, Inc., Houston, TX (US)

(72) Inventors: Stanley V. Stephenson, Duncan, OK (US); Ronald G. Dusterhoft, Katy, TX (US); Shameem Siddiqui, Richmond, TX (US); Liang Xu, The Woodland, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 57 days.

(21) Appl. No.: 16/769,528

(22) PCT Filed: Jan. 30, 2018

(86) PCT No.: PCT/US2018/015939
§ 371 (c)(1),
(2) Date: Jun. 3, 2020

(87) PCT Pub. No.: WO2019/151985
PCT Pub. Date: Aug. 8, 2019

(65) Prior Publication Data
US 2020/0385630 A1 Dec. 10, 2020

(51) Int. Cl.
*E21B 43/16* (2006.01)
*E21B 43/26* (2006.01)
(Continued)

(52) U.S. Cl.
CPC .............. *C09K 8/594* (2013.01); *C09K 8/70* (2013.01); *C09K 8/703* (2013.01); *E21B 43/16* (2013.01); *E21B 43/2605* (2020.05)

(58) Field of Classification Search
None
See application file for complete search history.

(56) References Cited

U.S. PATENT DOCUMENTS

| 4,344,489 A | * | 8/1982 | Bonaparte ............ A62C 3/0235 102/383 |
| 8,991,499 B2 | | 3/2015 | Nevison |

(Continued)

FOREIGN PATENT DOCUMENTS

| WO | 2014137625 A1 | 9/2014 |
| WO | 2016086295 A1 | 6/2016 |

(Continued)

OTHER PUBLICATIONS

Eakin et al. "Measurement and Correlation of Miscibility Pressures of Reservoir Oils." Paper presented at the SPE Annual Technical Conference and Exhibition, Houston, Texas, Oct. 1988. doi: https://doi.org/10.2118/18065-MS. (Year: 1988).*

(Continued)

*Primary Examiner* — Charles R Nold
(74) *Attorney, Agent, or Firm* — McGuireWoods LLP

(57) ABSTRACT

Included are methods and systems for enhancing recovery of a hydrocarbon fluid. An example method includes selecting a liquefied natural gas capable of being processed into a modified liquefied natural gas having a desired composition and adjusting the composition of the liquefied natural gas to provide the modified liquefied natural gas with the desired composition. The method further includes preparing a treatment fluid from the modified liquefied natural gas, introducing the treatment fluid into a wellbore, and contacting the hydrocarbon fluid with the treatment fluid in the wellbore.

20 Claims, 4 Drawing Sheets

(51) Int. Cl.
*C09K 8/70* (2006.01)
*C09K 8/594* (2006.01)

(56) References Cited

U.S. PATENT DOCUMENTS

| | | | |
|---|---|---|---|
| 9,033,035 B2 | 5/2015 | Nevison | |
| 9,181,789 B2 | 11/2015 | Nevison | |
| 9,187,996 B1 | 11/2015 | Nevison et al. | |
| 2006/0065400 A1 | 3/2006 | Smith | |
| 2013/0220605 A1* | 8/2013 | Vandor | C09K 8/62 |
| | | | 166/267 |
| 2013/0341010 A1 | 12/2013 | Nevison | |
| 2014/0000899 A1* | 1/2014 | Nevison | E21B 43/26 |
| | | | 166/308.1 |
| 2014/0262282 A1 | 9/2014 | Joseph et al. | |
| 2018/0058182 A1* | 3/2018 | Babcock | E21B 43/16 |

FOREIGN PATENT DOCUMENTS

| | | |
|---|---|---|
| WO | 2017058484 A1 | 4/2017 |
| WO | 2017058485 A1 | 4/2017 |
| WO | 2017058487 A1 | 4/2017 |

OTHER PUBLICATIONS

International Search Report and Written Opinion dated Oct. 17, 2018; International PCT Application No. PCT/US2018/015939.

* cited by examiner

US 11,370,959 B2

USE OF LIQUID NATURAL GAS FOR WELL TREATMENT OPERATIONS

TECHNICAL FIELD

The present disclosure relates to well treatment operations using liquefied natural gas, and more particularly, to selecting and adjusting the composition of liquefied natural gas to maximize the solubility and miscibility of a target reservoir fluid with the liquefied natural gas.

BACKGROUND

Treatment operations, for example, stimulation techniques, may be used to increase the recovery rate of hydrocarbons obtained from a subterranean formation. For example, some unconventional subterranean formations may be fractured to improve well productivity by placing or enhancing fractures running from the wellbore into the surrounding subterranean formation. These fractures may allow the hydrocarbons within the subterranean formation to flow more freely out of the subterranean formation through the creation of these additional flowpaths. Fracturing of these subterranean formations is typically performed by injection of a fracturing fluid into the subterranean formation at a pressure exceeding the fracture pressure of the subterranean formation. The hydrocarbon fluids may then be pumped out of the formation to the surface.

These treatment fluids most commonly comprise an aqueous base fluid. The use of aqueous base fluids has had several drawbacks. Primarily, the environmental cost of these fluids is high as the treatment operations use large volumes of water, and recycling the water requires additional equipment, great expense, and is not possible in all circumstances. Liquefied gases such as carbon dioxide and nitrogen may serve as a potential replacement for water. These gases increase production as they have better miscibility with the reservoir hydrocarbon fluids than the aqueous base fluids, allowing said hydrocarbon fluids to more easily flow out of the formation; however, these gases also come with drawbacks. For example, these gases must be removed from the hydrocarbon fluid before it can be introduced into a pipeline. This removal can slow down production and increase operational expenditure. Further, these gases must be supplied and transported to the wellsite, a process that may be difficult to perform for some wellsites. Moreover, the transport of these gases is typically done under pressure, which may present additional drawbacks for their safe transport. Further, the possibility exists that the supplier may not be able to provide a sufficient supply at all times.

Stimulating or otherwise treating a well is important for meeting a desired rate of production. As such, the choice and composition of a treatment fluid is important for meeting that desired rate of production.

BRIEF DESCRIPTION OF THE DRAWINGS

Illustrative examples of the present disclosure are described in detail below with reference to the attached drawing figures, which are incorporated by reference herein, and wherein.

Figure 1:
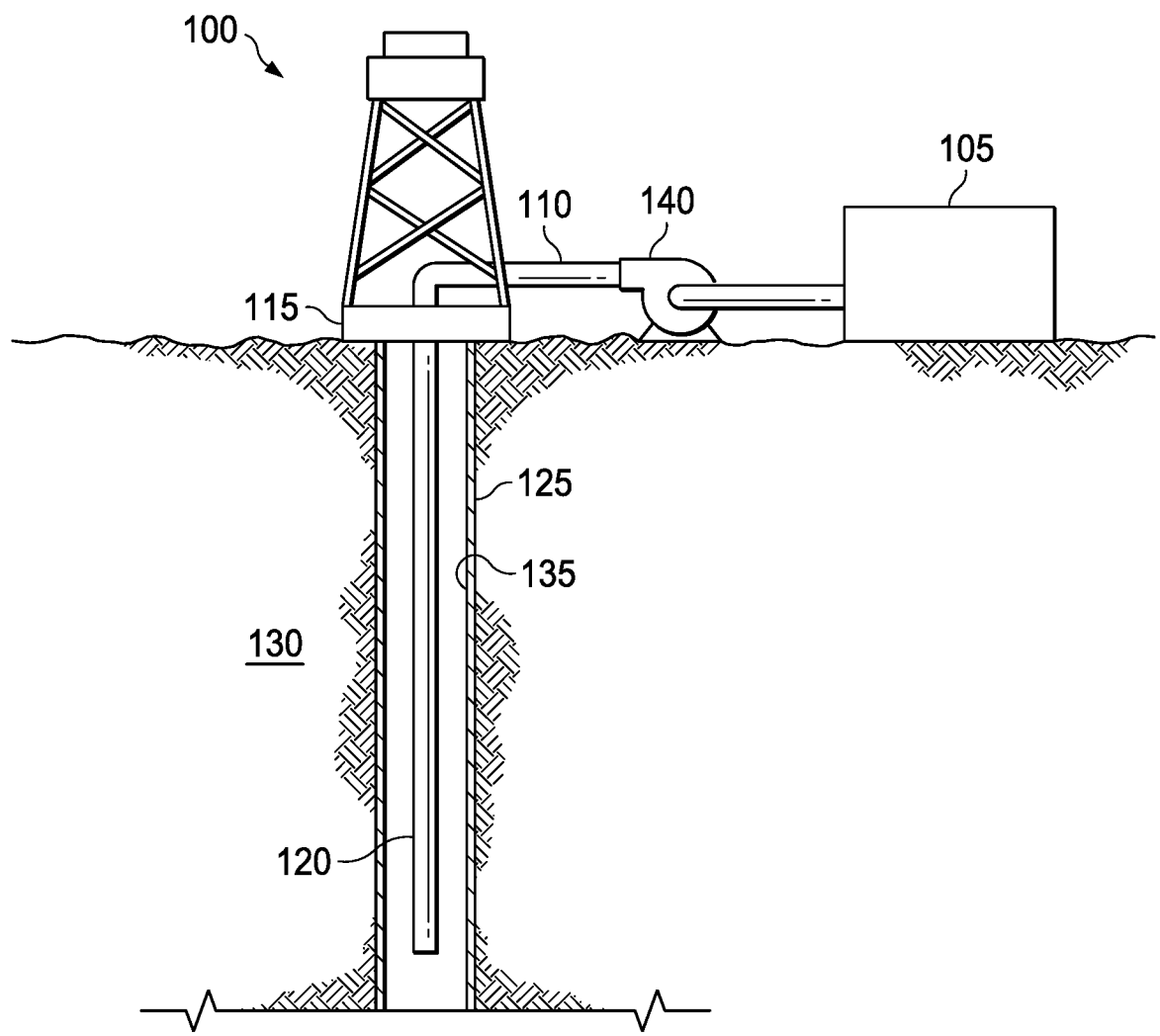
FIG. 1 is a schematic illustrating the surface and near-surface portions of a system to deliver a treatment fluid to a downhole location in accordance with one or more examples described herein.

The illustrated figures are only exemplary and are not intended to assert or imply any limitation with regard to the environment, architecture, design, or process in which different examples may be implemented.

DETAILED DESCRIPTION

The present disclosure relates to well treatment operations using liquefied natural gas, and more particularly, to selecting and adjusting the composition of liquefied natural gas to maximize the solubility and miscibility of a target reservoir fluid with the liquefied natural gas.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Treatment fluids can be employed in a variety of subterranean operations. As used herein the terms "treatment," "treating," and other grammatical equivalents thereof refer to any subterranean operation that uses a fluid in conjunction with performing a desired function and/or for achieving a desired purpose. The terms "treatment," "treating," and other grammatical equivalents thereof do not imply any particular action by the fluid or any component thereof. Example treatment fluids may include, for example, drilling fluids, fracturing fluids, cements, workover fluids, completion fluids, and the like.

Examples of the methods and systems described herein relate to selecting a liquefied natural gas based on its composition, and then modifying the composition of the liquefied natural gas to improve the solubility and miscibility of a known reservoir fluid with the liquefied natural gas. The examples described herein comprise the use of liquefied natural gas (hereafter "LNG"). The LNG may be supplied and transported to the wellsite or may be produced as natural gas from the wellsite or nearby wellsite within the same oilfield/reservoir and then liquefied at the wellsite or at a location nearby the wellsite. One of the many potential advantages of the disclosed methods and systems is that the LNG may provide better solubility and miscibility with a hydrocarbon fluid than an aqueous fluid. This may result in better production of the hydrocarbon fluid relative to the aqueous fluid. Another potential advantage of the disclosed methods and systems is that the LNG does not need to be removed from the hydrocarbon fluid prior to injection of the hydrocarbon fluid into the pipeline. As such, a well may be put on production sooner. Yet a further advantage of the disclosed methods and systems is that at some wellsites the produced natural gas may be used to supply the LNG. One more advantage is that LNG is much easier to liquefy and transport than $CO_2$ resulting in cost-savings and improved safety as it does not require pressurized storage.

The examples disclosed herein comprise the use of LNG as the base fluid of a treatment fluid for use in wellbore operations. LNG, as discussed herein, comprises a mixture of methane with other gases as it is naturally obtained from a well. LNG is often a variable mixture (all in mole percent) of about 87% to >99% methane ($CH_4$), <1% to 10% ethane ($C_2H_6$), >1% to 5% propane ($C_3H_8$), >1% to <1% butane ($C_4H_{10}$), and traces of other gases such as carbon dioxide, nitrogen, and longer chain hydrocarbons. The natural gas may be liquefied through liquefaction or any other sufficient means. The LNG may be provided in the treatment fluid as the sole base fluid of the treatment fluid, i.e., the LNG is not mixed with any other fluids such as an aqueous base fluid in order to provide the treatment fluid. In alternative examples, the LNG may be mixed with another base fluid, for example an aqueous base fluid to provide the treatment fluid. In some examples, at least a portion of the LNG may be regassified in the treatment fluid prior to or during injection in the wellbore. In alternative examples, none of the LNG is regassified prior to or during injection in the wellbore. In examples where at least a portion of the LNG is regassified prior to or during injection in the wellbore, a heating component may be used to vaporize the at least a portion of the LNG. The heating component may be flameless in some of these additional optional examples. In some examples, the LNG may be foamed prior to or during injection in the wellbore. In alternative examples, the LNG may not be foamed prior to or during injection in the wellbore.

Advantageously, the LNG may be used in the disclosed treatment fluids because of its miscibility with one or more of the specific targeted hydrocarbon fluids present in a target desirable subterranean formation of a well. The composition of the LNG affects its minimum miscibility pressure with the specific hydrocarbon fluid of the reservoir. As used herein, the "minimum miscibility pressure" is the lowest pressure at a constant temperature and composition, at which first- or multiple-contact miscibility may be achieved. At the minimum miscibility pressure the interfacial tension is zero and no interface exists between the fluids. As the minimum miscibility pressure is a factor of the composition of the target hydrocarbon fluid of the reservoir to be pumped and removed from the reservoir, the LNG composition must be tailored for each target hydrocarbon fluid that the LNG is to be miscible with in order to obtain a low minimum miscibility pressure. Pumping at these low pressures provides enhanced recovery and the most cost-savings to the wellbore operation. For fracturing examples, the treatment fluid may be be ramped up to a pressure greater than the fracturing pressure of the subterranean formation. Once the subterranean formation has been successfully fractured and the well is on production, the treatment fluid may be pumped at the minimum miscibility pressure or slightly above to enhance recovery.

In order to obtain a low minimum miscibility pressure, the composition of the LNG may be adjusted to be miscible with a specific hydrocarbon fluid from the target subterranean formation at as low a pressure as can be achieved based on the LNG compositions and resources available. One such method of adjusting the composition of the LNG is to select an LNG for use based on its composition to provide the lowest minimum miscibility pressure amongst the several options of LNG compositions. For example, if several LNGs are available for use, the compositions of each may be determined and modeled with the composition of a sample of the target hydrocarbon fluid to determine the specific LNG that will comprise the lowest minimum miscibility pressure of the available LNG compositions. A further method of adjusting the composition of the LNG is to modify the LNG composition to provide a lower minimum miscibility pressure than what is achievable with the present or native LNG composition. The LNG may be modified by adjusting the values of the components of the LNG composition. For example, the concentration of methane, ethane, propane, butane, carbon dioxide, etc. may be adjusted to provide an LNG that is miscible at lower pressures with the specific hydrocarbon fluid. As a further example, if an LNG having a specific composition is modeled to have a lower minimum miscibility pressure if a known volume of ethane is added to the LNG, a small volume of ethane may be added to the LNG prior to or during preparation of the treatment fluid. This modified LNG treatment fluid may then be used for a well treatment operation. This LNG composition modification is not limited to one compositional component. Any one of the multiple components of an LNG composition may be adjusted. The LNG composition may be altered using any sufficient method for adjusting the volumes of the compositional components of the LNG composition. In some examples, the value of the LNG compositional components may be adjusted such that the value of one or more of these components is in a concentration outside the range seen in natural gas as it is normally obtained as described above. For example, and as discussed above, ethane is normally in a concentration in a range of about <1% to 10%. This value of ethane may be adjusted such that the ethane concentration exceeds 10%. As a further example, methane is present in natural gas in a concentration of about 87% to 99%. In some examples, the volume(s) of the other compositional components may be increased such that the concentration of methane in the LNG is less than 87%. The adjustment to the LNG composition may be done prior to or during injection of the LNG composition in the wellbore.

In some examples, the chosen LNG may not be selected from existing supplies or suppliers based on its composition. In these examples, the LNG may be provided from natural gas produced from the well or nearby wells and which has been liquefied through liquefaction or other sufficient means. In these examples, the LNG may be altered as described above by modeling and adjusting the concentration of the compositional components of the LNG to provide an LNG with the lowest minimum miscibility pressure for a target hydrocarbon fluid within the wellbore. The LNG may be produced at the wellsite or at a nearby wellsite as desired.

The LNG composition may be added to the treatment fluid in any sufficient concentration. The concentration of the LNG in the treatment fluid may range from about 5% (V/V) of the treatment fluid to about 100% (V/V) of the treatment fluid. The concentration of the LNG in the treatment fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the LNG in the treatment fluid may range from about 5% (V/V) to about 100% (V/V) of the treatment fluid, may range from about 6% (V/V) to about 100% (V/V) of the treatment fluid, may range from about 7% (V/V) to about 100% (V/V) of the treatment fluid, may range from about 8% (V/V) to about 100% (V/V) of the treatment fluid, may range from about 9% (V/V) to about 100% (V/V) of the treatment fluid, may range from about 10% (V/V) to about 100% (V/V) of the treatment fluid, may range from about 15% (V/V) to about 100% (V/V) of the treatment fluid, may range from about 20% (V/V) to about 100% (V/V) of the treatment fluid, may range from about 25% (V/V) to about 100% (V/V) of the treatment fluid, may range from about 30% (V/V) to about 100% (V/V) of the treatment fluid, may range from about 35% (V/V) to about 100% (V/V) of the treatment fluid, may range from about 40% (V/V) to about 100% (V/V) of the treatment fluid, may range from about 45% (V/V) to about 100% (V/V) of the treatment fluid, may range from about 50% (V/V) to about 100% (V/V) of the treatment fluid, may range from about 55% (V/V) to about 100% (V/V) of the treatment fluid, may range from about 60% (V/V) to about 100% (V/V) of the treatment fluid, may range from about 65% (V/V) to about 100% (V/V) of the treatment fluid, may range from about 70% (V/V) to about 100% (V/V) of the treatment fluid, may range from about 75% (V/V) to about 100% (V/V) of the treatment fluid, may range from about 80% (V/V) to about 100% (V/V) of the treatment fluid, or may range from about 90% (V/V) to about 100% (V/V) of the treatment fluid. As another example, the concentration of the LNG in the treatment fluid may range from about 5% (V/V) to about 100% (V/V) of the treatment fluid, may range from about 5% (V/V) to about 90% (V/V) of the treatment fluid, may range from about 5% (V/V) to about 80% (V/V) of the treatment fluid, may range from about 5% (V/V) to about 75% (V/V) of the treatment fluid, may range from about 5% (V/V) to about 70% (V/V) of the treatment fluid, may range from about 5% (V/V) to about 65% (V/V) of the treatment fluid, may range from about 5% (V/V) to about 60% (V/V) of the treatment fluid, may range from about 5% (V/V) to about 55% (V/V) of the treatment fluid, may range from about 5% (V/V) to about 50% (V/V) of the treatment fluid, may range from about 5% (V/V) to about 45% (V/V) of the treatment fluid, may range from about 5% (V/V) to about 40% (V/V) of the treatment fluid, may range from about 5% (V/V) to about 35% (V/V) of the treatment fluid, may range from about 5% (V/V) to about 30% (V/V) of the treatment fluid, may range from about 5% (V/V) to about 25% (V/V) of the treatment fluid, may range from about 5% (V/V) to about 20% (V/V) of the treatment fluid, may range from about 5% (V/V) to about 15% (V/V) of the treatment fluid, may range from about 5% (V/V) to about 10% (V/V) of the treatment fluid, may range from about 5% (V/V) to about 9% (V/V) of the treatment fluid, may range from about 5% (V/V) to about 8% (V/V) of the treatment fluid, may range from about 5% (V/V) to about 7% (V/V) of the treatment fluid, or may range from about 5% (V/V) to about 6% (V/V) of the treatment fluid. It is to be understood that the above ranges encompass every range or subset of ranges in-between. With the benefit of this disclosure, one of ordinary skill in the art will be readily able to obtain and prepare a treatment fluid comprising the LNG for a given application.

In order to provide an LNG with the lowest minimum miscibility pressure, the target hydrocarbon fluid must be sampled from the subterranean formation, quality controlled, tested and modeled with an Equation of State. Obtaining a sample of the hydrocarbon fluid may be done in any sufficient manner. Modeling of the LNG and the hydrocarbon fluid may be done using any sufficient fluid modeling software in order to determine the minimum miscibility pressure of the specific LNG and the specific hydrocarbon fluid.

In some optional examples, an aqueous base fluid may also be used in addition to the LNG base fluid to prepare the treatment fluid. The aqueous base fluid may generally be from any source. In various examples, the aqueous base fluid may comprise fresh water, salt water, seawater, brine, or an aqueous salt solution. In some examples, the aqueous base fluid may comprise a monovalent brine or a divalent brine. Suitable monovalent brines include, but are not limited to, sodium chloride brines, sodium bromide brines, potassium chloride brines, potassium bromide brines, and the like. Suitable divalent brines include, but are not limited to, magnesium chloride brines, calcium chloride brines, and the like.

The total concentration of the aqueous base fluid in these optional examples of the treatment fluid may range from about 0.1% (V/V) of the treatment fluid to about 95% (V/V) of the treatment fluid. The concentration of the aqueous base fluid in the treatment fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the aqueous base fluid in the treatment fluid may range from about 0.1% (V/V) to about 95% (V/V) of the treatment fluid, may range from about 0.2% (V/V) to about 95% (V/V) of the treatment fluid, may range from about 0.3% (V/V) to about 95% (V/V) of the treatment fluid, may range from about 0.4% (V/V) to about 95% (V/V) of the treatment fluid, may range from about 0.5% (V/V) to about 95% (V/V) of the treatment fluid, may range from about 0.6% (V/V) to about 95% (V/V) of the treatment fluid, may range from about 0.7% (V/V) to about 95% (V/V) of the treatment fluid, may range from about 0.8% (V/V) to about 95% (V/V) of the treatment fluid, may range from about 0.9% (V/V) to about 95% (V/V) of the treatment fluid, may range from about 1% (V/V) to about 95% (V/V) of the treatment fluid, may range from about 2% (V/V) to about 95% (V/V) of the treatment fluid, may range from about 3% (V/V) to about 95% (V/V) of the treatment fluid, may range from about 4% (V/V) to about 95% (V/V) of the treatment fluid, may range from about 5% (V/V) to about 95% (V/V) of the treatment fluid, may range from about 6% (V/V) to about 95% (V/V) of the treatment fluid, may range from about 7% (V/V) to about 95% (V/V) of the treatment fluid, may range from about 8% (V/V) to about 95% (V/V) of the treatment fluid, may range from about 9% (V/V) to about 95% (V/V) of the treatment fluid, may range from about 10% (V/V) to about 95% (V/V) of the treatment fluid, may range from about 20% (V/V) to about 95% (V/V) of the treatment fluid, may range from about 30% (V/V) to about 95% (V/V) of the treatment fluid, may range from about 40% (V/V) to about 95% (V/V) of the treatment fluid, may range from about 45% (V/V) to about 95% (V/V) of the treatment fluid, may range from about 50% (V/V) to about 95% (V/V) of the treatment fluid, may range from about 55% (V/V) to about 95% (V/V) of the treatment fluid, may range from about 60% (V/V) to about 95% (V/V) of the treatment fluid, may range from about 65% (V/V) to about 95% (V/V) of the treatment fluid, may range from about 70% (V/V) to about 95% (V/V) of the treatment fluid, may range from about 75% (V/V) to about 95% (V/V) of the treatment fluid, may range from about 80% (V/V) to about 95% (V/V) of the treatment fluid, may range from about 85% (V/V) to about 95% (V/V) of the treatment fluid, or may range from about 90% (V/V) to about 95% (V/V) of the treatment fluid. As another example, the concentration of the aqueous base fluid in the treatment fluid may range from about 0.1% (V/V) to about 95% (V/V) of the treatment fluid, may range from about 0.1% (V/V) to about 90% (V/V) of the treatment fluid, may range from about 0.1% (V/V) to about 85% (V/V) of the treatment fluid, may range from about 0.1% (V/V) to about 80% (V/V) of the treatment fluid, may range from about 0.1% (V/V) to about 75% (V/V) of the treatment fluid, may range from about 0.1% (V/V) to about 70% (V/V) of the treatment fluid, may range from about 0.1% (V/V) to about 65% (V/V) of the treatment fluid, may range from about 0.1% (V/V) to about 60% (V/V) of the treatment fluid, may range from about 0.1% (V/V) to about 55% (V/V) of the treatment fluid, may range from about 0.1% (V/V) to about 50% (V/V) of the treatment fluid, may range from about 0.1% (V/V) to about 45% (V/V) of the treatment fluid, may range from about 0.1% (V/V) to about 40% (V/V) of the treatment fluid, may range from about 0.1% (V/V) to about 35% (V/V) of the treatment fluid, may range from about 0.1% (V/V) to about 30% (V/V) of the treatment fluid, may range from about 0.1% (V/V) to about 25% (V/V) of the treatment fluid, may range from about 0.1% (V/V) to about 20% (V/V) of the treatment fluid, may range from about 0.1% (V/V) to about 15% (V/V) of the treatment fluid, may range from about 0.1% (V/V) to about 10% (V/V) of the treatment fluid, may range from about 0.1% (V/V) to about 9% (V/V) of the treatment fluid, may range from about 0.1% (V/V) to about 8% (V/V) of the treatment fluid, may range from about 0.1% (V/V) to about 7% (V/V) of the treatment fluid, may range from about 0.1% (V/V) to about 6% (V/V) of the treatment fluid, may range from about 0.1% (V/V) to about 5% (V/V) of the treatment fluid, may range from about 0.1% (V/V) to about 4% (V/V) of the treatment fluid, may range from about 0.1% (V/V) to about 3% (V/V) of the treatment fluid, may range from about 0.1% (V/V) to about 2% (V/V) of the treatment fluid, may range from about 0.1% (V/V) to about 1% (V/V) of the treatment fluid, may range from about 0.1% (V/V) to about 0.9% (V/V) of the treatment fluid, may range from about 0.1% (V/V) to about 0.8% (V/V) of the treatment fluid, may range from about 0.1% (V/V) to about 0.7% (V/V) of the treatment fluid, may range from about 0.1% (V/V) to about 0.6% (V/V) of the treatment fluid, may range from about 0.1% (V/V) to about 0.5% (V/V) of the treatment fluid, may range from about 0.1% (V/V) to about 0.4% (V/V) of the treatment fluid, may range from about 0.1% (V/V) to about 0.3% (V/V) of the treatment fluid, or may range from about 0.1% (V/V) to about 0.2% (V/V) of the treatment fluid. It is to be understood that the above ranges encompass every range or subset of ranges in-between. With the benefit of this disclosure, one of ordinary skill in the art will be readily able to obtain and prepare a treatment fluid comprising LNG and aqueous base fluids for a given application.

In some optional examples, surfactants may be added to the treatment fluid. Examples of surfactants may include, but are not limited to, ethoxylated branched or linear C10-C18 alcohols, C8-C18 alkanolamides, ethoxylated C8-C18 alkanolamides, ethoxylated tall oil, ethoxylated C8-C18 alkylamine, C8-C16 alkylpolyglucoside, dodecylbenzene sulfonate, sulfonate salts of alkyl diphenylether, alpha olefin sulfonate, C8-C16 alkyl sulfate, C8-C18 amine oxides, benzyldimethylalkylammonium chloride, betaines, sultaines, salts thereof, derivatives thereof, and any combination thereof. A commercial example of a suitable surfactant is Tergitol™ 15-S-15 available from Dow Chemical Company of Michigan, USA. TERGITOL™ is a trademark of the Union Carbide Corporation. Another commercial example of a suitable surfactant is Bio-Soft® N25-9 available from Stepan Company of Illinois, USA. BIO-SOFT® is a registered trademark of the Stepan Company. Another commercial example of a suitable surfactant is Makon® TD-18 available from Stepan Company of Illinois, USA. MAKON® is a registered trademark of the Stepan Company. Another commercial example of a suitable surfactant is Amadol 511 available from Akzo Nobel NV of Amsterdam, Netherlands. Another commercial example of a suitable surfactant is Amadol 5133 available from Akzo Nobel NV of Amsterdam, Netherlands. Another commercial example of a suitable surfactant is Ninol® C-5 available from Stepan Company of Illinois, USA. NINOL® is a registered trademark of the Stepan Company. Another commercial example of a suitable surfactant is Ninex® Mt-615 available from Stepan Company of Illinois, USA. NINEX® is a registered trademark of the Stepan Company.

In some optional examples, weakly-emulsifying surfactants may be added to the treatment fluid. Weakly-emulsifying surfactants are those specific surfactants which may form short-lived oil-in-water emulsions that may be used, in some examples, to enhance mobility of oil and/or gas while preventing or otherwise avoiding the formation of tight emulsions between the oil and any aqueous fluids in the treatment fluids or in the formation. In addition, these short-lived oil-in-water emulsions may be capable of dispersing additional oil and/or gas droplets into the aqueous phase and enabling those oil and/or gas molecules to deform and squeeze through tiny pore spaces in the formation rocks. In some examples, the weakly-emulsifying surfactants of the treatment fluid may be capable of adsorbing on either or both of a rock surface of the subterranean formation and one or more oil and/or gas molecules within the subterranean formation, so as to increase the probability of stripping oil and/or gas from rocks within the subterranean formation.

In some further optional examples, the weakly-emulsifying surfactants may be used to yield an oil-in-water foamed emulsion. In some of these examples, the foaming may be achieved by the use of additional foaming agents or by entraining air or other gases into the emulsion. In some of these examples, only the weakly-emulsifying surfactant may be used to yield and sustain the foam. The weakly-emulsifying surfactants may be used to sustain a foam between the injected treatment fluid and crude hydrocarbons within the subterranean formation, thereby increasing mobility of said crude hydrocarbons.

Examples of these specific weakly-emulsifying surfactants may include, but are not limited to, ethoxylated alcohols and polyglucosides, ethoxylated long-chain alcohols (e.g., ethoxylated dodecanol (ethoxylation may take place at any point along the alcohol), alkyl ammonium bromides (the alkyl chain of the alkyl ammonium bromide may be anywhere from 1 to 50 carbons long, and be branched or un-branched e.g., cetyl trimethyl ammonium bromide), alkyl sulfonates (e.g., methyl sulfonate, heptyl sulfonate, decylbenzene sulfonate, dodecylbenzene sulfonate, etc.), alkoxylated sulfates, hydroxysultaines (e.g., cocoamidopropyl hydroxysultaine, lauramidopropyl hydroxysultaine, lauryl hydroxysultaine, etc.), or any combination thereof.

The total concentration of the surfactants in these optional examples of the treatment fluid may range from about 0.1% (V/V) of the treatment fluid to about 20% (V/V) of the treatment fluid. The concentration of the surfactants in the treatment fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the surfactants in the treatment fluid may range from about 0.1% (V/V) to about 20% (V/V) of the treatment fluid, may range from about 0.2% (V/V) to about 20% (V/V) of the treatment fluid, may range from about 0.3% (V/V) to about 20% (V/V) of the treatment fluid, may range from about 0.4% (V/V) to about 20% (V/V) of the treatment fluid, may range from about 0.5% (V/V) to about 20% (V/V) of the treatment fluid, may range from about 0.6% (V/V) to about 20% (V/V) of the treatment fluid, may range from about 0.7% (V/V) to about 20% (V/V) of the treatment fluid, may range from about 0.8% (V/V) to about 20% (V/V) of the treatment fluid, may range from about 0.9% (V/V) to about 20% (V/V) of the treatment fluid, may range from about 1% (V/V) to about 20% (V/V) of the treatment fluid, may range from about 2% (V/V) to about 20% (V/V) of the treatment fluid, may range from about 3% (V/V) to about 20% (V/V) of the treatment fluid, may range from about 4% (V/V) to about 20% (V/V) of the treatment fluid, may range from about 5% (V/V) to about 20% (V/V) of the treatment fluid, may range from about 6% (V/V) to about 20% (V/V) of the treatment fluid, may range from about 7% (V/V) to about 20% (V/V) of the treatment fluid, may range from about 8% (V/V) to about 20% (V/V) of the treatment fluid, may range from about 9% (V/V) to about 20% (V/V) of the treatment fluid, may range from about 10% (V/V) to about 20% (V/V) of the treatment fluid, may range from about 11% (V/V) to about 20% (V/V) of the treatment fluid, may range from about 12% (V/V) to about 20% (V/V) of the treatment fluid, may range from about 13% (V/V) to about 20% (V/V) of the treatment fluid, may range from about 14% (V/V) to about 20% (V/V) of the treatment fluid, may range from about 15% (V/V) to about 20% (V/V) of the treatment fluid, may range from about 16% (V/V) to about 20% (V/V) of the treatment fluid, may range from about 17% (V/V) to about 20% (V/V) of the treatment fluid, may range from about 18% (V/V) to about 20% (V/V) of the treatment fluid, or may range from about 19% (V/V) to about 20% (V/V) of the treatment fluid. As another example, the concentration of the surfactants in the treatment fluid may range from about 0.1% (V/V) to about 19% (V/V) of the treatment fluid, may range from about 0.1% (V/V) to about 18% (V/V) of the treatment fluid, may range from about 0.1% (V/V) to about 17% (V/V) of the treatment fluid, may range from about 0.1% (V/V) to about 16% (V/V) of the treatment fluid, may range from about 0.1% (V/V) to about 15% (V/V) of the treatment fluid, may range from about 0.1% (V/V) to about 14% (V/V) of the treatment fluid, may range from about 0.1% (V/V) to about 13% (V/V) of the treatment fluid, may range from about 0.1% (V/V) to about 12% (V/V) of the treatment fluid, may range from about 0.1% (V/V) to about 11% (V/V) of the treatment fluid, may range from about 0.1% (V/V) to about 10% (V/V) of the treatment fluid, may range from about 0.1% (V/V) to about 9% (V/V) of the treatment fluid, may range from about 0.1% (V/V) to about 8% (V/V) of the treatment fluid, may range from about 0.1% (V/V) to about 7% (V/V) of the treatment fluid, may range from about 0.1% (V/V) to about 6% (V/V) of the treatment fluid, may range from about 0.1% (V/V) to about 5% (V/V) of the treatment fluid, may range from about 0.1% (V/V) to about 4% (V/V) of the treatment fluid, may range from about 0.1% (V/V) to about 3% (V/V) of the treatment fluid, may range from about 0.1% (V/V) to about 2% (V/V) of the treatment fluid, may range from about 0.1% (V/V) to about 1% (V/V) of the treatment fluid, may range from about 0.1% (V/V) to about 0.9% (V/V) of the treatment fluid, may range from about 0.1% (V/V) to about 0.8% (V/V) of the treatment fluid, may range from about 0.1% (V/V) to about 0.7% (V/V) of the treatment fluid, may range from about 0.1% (V/V) to about 0.6% (V/V) of the treatment fluid, may range from about 0.1% (V/V) to about 0.5% (V/V) of the treatment fluid, may range from about 0.1% (V/V) to about 0.4% (V/V) of the treatment fluid, may range from about 0.1% (V/V) to about 0.3% (V/V) of the treatment fluid, or may range from about 0.1% (V/V) to about 0.2% (V/V) of the treatment fluid. It is to be understood that the above ranges encompass every range or subset of ranges in-between. With the benefit of this disclosure, one of ordinary skill in the art will be readily able to obtain and prepare a treatment fluid comprising a surfactant for a given application.

In some examples, the treatment fluid may be foamed with a foaming additive and/or by entraining a gas into the treatment fluid. The gas used for foaming the treatment fluid may be any suitable gas for foaming, including, but not limited to: methane gas, ethane, propane, butane or combinations thereof. Generally, the gas should be present in an amount sufficient to form the desired amount or quality of foam. Foaming additives may be included to, for example, facilitate foaming and/or stabilize the resultant foam formed therewith. Examples of suitable foaming additives include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; or combinations thereof.

The present disclosure provides methods and systems for treating a subterranean formation with a treatment fluid comprising LNG. The methods may include preparing a treatment fluid comprising LNG having a specific composition to be miscible with a target hydrocarbon fluid in a subterranean formation. The methods may further include sampling the target hydrocarbon fluid and modeling the miscibility of the target hydrocarbon fluid with an LNG composition. The methods may include pumping the treatment fluid in a wellbore penetrating a subterranean formation. The methods may also include introducing the treatment fluid into a portion of the subterranean formation from the wellbore. The subterranean formation may be fractured. The treatment fluid may enter the subterranean formation and flow to areas within the subterranean formation containing the target hydrocarbon fluid. The systems may include pumping and mixing equipment to convey the treatment fluid to the interval of the wellbore comprising the target subterranean formation.

Example systems may comprise a pump fluidly coupled to a tubular, the tubular containing a treatment fluid comprising LNG. The pump may be a high-pressure pump. As used herein, the term "high-pressure pump" will refer to a pump that is capable of delivering a fluid downhole at a pressure of about 1000 psi or greater. A high-pressure pump may be used when it is desired to introduce the treatment fluid to a subterranean formation at or above a fracture gradient of the subterranean formation, but it may also be used in cases where fracturing is not desired. In some examples, the high-pressure pump may be capable of fluidly conveying particulate matter, such as proppant particulates, into the subterranean formation. Suitable high-pressure pumps will be known to one having ordinary skill in the art and may include, but are not limited to, floating piston pumps and positive displacement pumps. In other examples, the pump may be a low-pressure pump. As used herein, the term "low-pressure pump" will refer to a pump that operates at a pressure of about 1000 psi or less. In some examples, a low-pressure pump may be fluidly coupled to a high-pressure pump that is fluidly coupled to the tubular. That is, the low-pressure pump may be configured to convey the treatment fluid to the high-pressure pump. In such examples, the low-pressure pump may "step up" the pressure of the treatment fluid before it reaches the high-pressure pump. In any example, a high-pressure pump and/or a low-pressure pump may convey the treatment fluid to the location of a target hydrocarbon fluid. The pumps may supply sufficient pressure to allow the treatment fluid to be miscible with the target hydrocarbon fluid. That is, the pumps may meet or exceed the minimum miscibility pressure of the treatment fluid and the target hydrocarbon fluid.

In some examples, the systems described herein may further comprise a mixing tank that is upstream of the pump and is the vessel in which the treatment fluid is formulated. In various examples, the pump (e.g., a low-pressure pump, a high-pressure pump, or a combination thereof) may convey the treatment fluid from the mixing tank or other source of the treatment fluid to the tubular. In other examples, the treatment fluid may be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 illustrates a schematic of the surface and near-surface portions of a system that can deliver the treatment fluids described herein to a downhole location, according to one or more examples. It should be noted that while FIG. 1 generally depicts a land-based system, it is to be recognized that like systems may be operated in subsea locations as well. As depicted in FIG. 1, system 100 may include mixing tank 105, in which a treatment fluid comprising LNG as described herein may be formulated. The treatment fluid may be conveyed via line 110 to wellhead 115, where the treatment fluid enters tubular 120. Tubular 120 may extend from wellhead 115 into a wellbore 125 penetrating subterranean formation 130. Wellbore 125 may be any type of wellbore including vertical, horizontal, deviated, etc. The illustrated portion of wellbore 125 is cased with a casing 135. It is to be understood that in some examples wellbore 125 may be uncased. Upon being ejected from tubular 120, the treatment fluid may subsequently enter into subterranean formation 130 as described in FIG. 2 below. Pump 140 may be configured to raise the pressure of the treatment fluid to a desired degree before its introduction into tubular 120. Examples of treatment fluids may include, but are not limited to, displacement fluids, fracturing fluids, PAD fluids, etc.

Although not depicted in FIG. 1, the treatment fluid may, in some examples, flow back to wellhead 115 and exit subterranean formation 130. In some optional examples, the treatment fluid that has flowed back to wellhead 115 may subsequently be recovered and recirculated to subterranean formation 130. Further, in some examples not depicted in FIG. 1, the treatment fluid may, in some examples, be introduced into a pipeline along with a target hydrocarbon fluid that the treatment fluid is miscible with. As the treatment fluid primarily comprises LNG, it does not need to be removed prior to introduction into a transporting pipeline.

Figure 2:
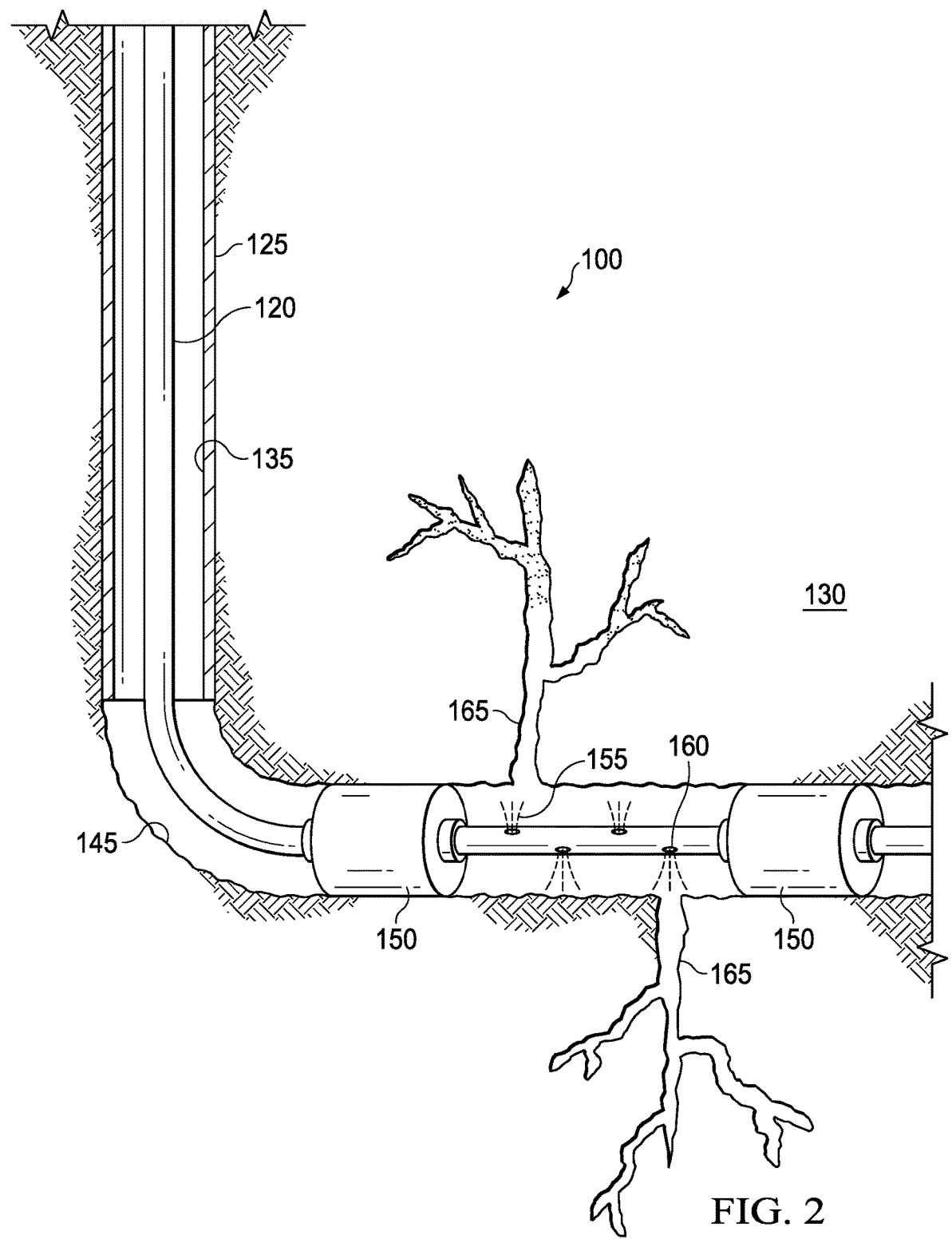
FIG. 2 is a schematic illustrating the downhole portion of the system illustrated in FIG. 2 in accordance with one or more examples described herein.

FIG. 2 illustrates a schematic of the downhole portion of the system 100 illustrated in FIG. 1, according to one or more examples. As depicted in FIG. 2, tubular 120 extends from the wellhead 115 (as illustrated in FIG. 1) into wellbore 125 penetrating subterranean formation 130. After descending through the heel 145 of the wellbore 125, tubular 120 may be coupled to one or more packers 150 positioned to isolate an interval of wellbore 125. A treatment fluid 155, as described herein, may exit tubular 120 through openings 160. The treatment fluid 155 may be introduced into the subterranean formation 130 via a primary fracture 165 of other such opening into the subterranean formation 130. As discussed above, the treatment fluid 155 comprises LNG having a specific composition to allow the treatment fluid 155 to be miscible with a hydrocarbon fluid flowing out of the subterranean formation 130 if the minimum miscibility pressure is exceeded, thus enhancing hydrocarbon recovery from the subterranean formation 130. It is to be recognized that system 100 is merely exemplary in nature, and various additional components may be present that have not necessarily been depicted in FIGS. 1 and 2 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

It should be clearly understood that the examples illustrated by FIGS. 1 and 2 are merely general applications of the principles of this disclosure in practice, and a wide variety of other examples are possible. Therefore, the scope of this disclosure is not limited in any manner to the details of FIGS. 1 and 2 as described herein.

Figure 3:
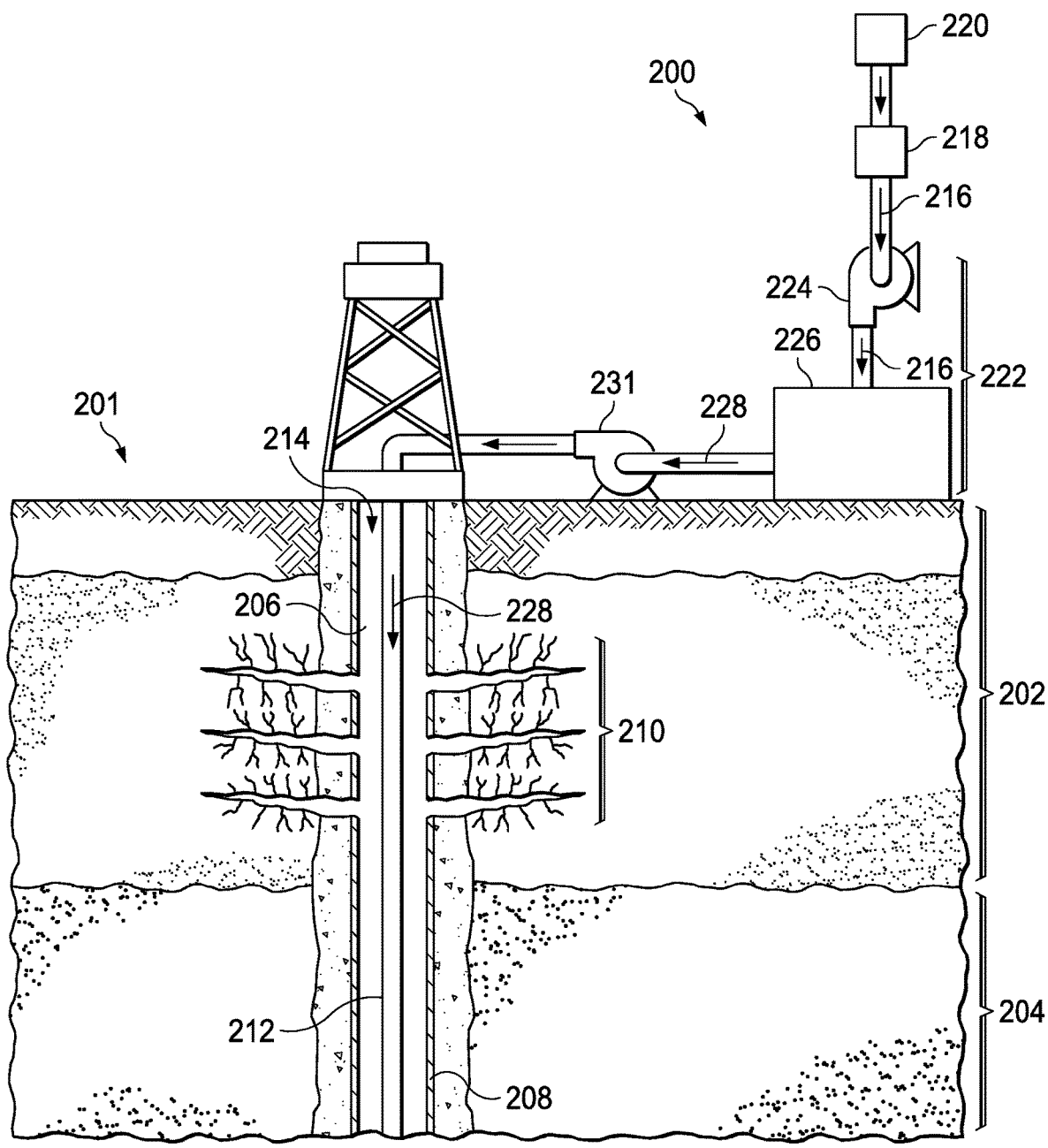
FIG. 3 is a schematic illustrating a repressurization system for enhanced recovery of a target hydrocarbon fluid in accordance with one or more examples described herein.

FIG. 3 is a schematic view of an example of an LNG pressuring system 200 for pressuring a formation 201. The formation 201 includes reservoir volumes 202, 204 composed of porous and permeable rocks (i.e. reservoir rocks) that contain reservoir fluids (e.g., oil, gas, water, hydrocarbons) located in an onshore environment or in an offshore environment. A well system includes at least one well 206 drilled to penetrate the formation 201 to carry out exploration and extraction of fluids from the reservoir volumes 202, 204. The well 206 of FIG. 3 is shown as near-vertical, but can be formed at any suitable angle to reach a hydrocarbon-rich portion of the formation 201. In other examples, the well 206 can follow a partially-vertical, angled, or even a partially-horizontal path through the formation 201. The well 206 is shown as being lined with a protective lining 208 extending through the formation 201. The protective lining 208 may include a casing, liner, or tubing made of any material, including steel, alloys, or polymers, among others.

The well 206 may also be partially or fully openhole (i.e. no protective lining). The protective lining 208 may be perforated so that the reservoir fluids may flow through fractures 210 formed in the formation 201 and into the well 206.

During primary recovery techniques (e.g., natural depletion), reservoir pressure is sufficient so that reservoir fluids can flow from the fractures 210 and into the well 206. As described herein, the reservoir pressure includes the pressure of the fluids present in pore spaces of the reservoir rocks. As the reservoir fluids are produced from the reservoir rocks, the pressure, flow capacity, and recovery factor from the reservoir volume 202 is reduced until production from the well 206 is minimal or no longer feasible. Since the reservoir volume 202 may contain oil that has been relieved of pressure such that the oil is near, at, or below its bubble point, natural gas can be injected into the well 206 to increase pressures to a level equal to or greater than the original reservoir pressures, for example, pressures exhibited at original production conditions. The terms pressured, re-pressured, pressurized, and repressurized are used interchangeably herein to imply that reservoir volume pressures are increased or restored to pressure levels occurring during initial recovery from the well 206.

In operation, a treatment fluid 228 comprising LNG 216 is injected into the well 206 to flow into a tubing string 212 or an annular area 214 located between an inner surface of the well 206 and the string 212. The composition of the LNG 216 has been adjusted as described above to make the LNG 216 introduced into the formation 201 miscible with one or more target hydrocarbon fluids of the reservoir volume 202 to help mobilize and flow the fluids from the reservoir volume 202 into the well 206. Samples of these target hydrocarbon fluids may be obtained prior to introduction of the treatment fluid 228.

The LNG pressuring system 200 includes an LNG source vessel 218 to store the LNG 216 of the treatment fluid 228 on-site at the well 206. The storage of LNG 216 at the well 206 reduces the distance between the source of the natural gas supply (e.g., remote pipelines, nearby wells, etc.), and the point of injection into the well 206 and thus overcomes any challenges associated with using and transporting LNG 216. In alternative embodiments, the stored LNG 216 may be provided from natural gas produced at the well and liquefied through liquefaction or any other sufficient technique. The LNG source vessel 218 includes a cooling system or a separate cooling system 220 located at the well 206 to maintain the LNG 216 at cryogenic temperatures. The LNG source vessel 218 is further in fluid communication with a cryogenic system 222. The cryogenic system 222 includes a cryogenic pump 224 capable of processing fluids at cryogenic temperatures. The cryogenic pump 224 supplies a feed pressure to flow the LNG 216 into a mixing unit 226 so that the treatment fluid 228 may be formulated. The treatment fluid 228 may have additional optional components such as an aqueous base fluid, surfactants, etc. added in mixing unit 226 to formulate the treatment fluid 228. If the composition of the LNG 216 has not already been adjusted to provide a treatment fluid 228 with a lower minimum miscibility pressure with the target hydrocarbon fluid, this process may occur in mixing unit 226 as well, and volumes of methane, ethane, propane, etc. may be added or otherwise adjusted to formulate treatment fluid 228 as desired. Additionally, if a foamed treatment fluid 228 is desired, the treatment fluid 228 may be foamed in any sufficient manner, for example, through the addition of foaming agents into mixing unit 226 or by entraining air into the treatment fluid 226. The treatment fluid 228 may then flow into the well 206 to increase the reservoir pressure of the reservoir volume 202 and to treat the formation 201. In some cases, an injection pump 231 pressurizes the treatment fluid 228 to maintain an injection flow rate sufficient to inject and deliver the treatment fluid 228 into the well 206 and further into the fractures 210.

It should be clearly understood that the LNG pressuring system 200 of FIG. 3 is merely one example of an application of the principles of this disclosure in practice, and a wide variety of other examples are possible. Therefore, the scope of this disclosure is not limited at all to the details of FIG. 3 described herein and/or depicted in any of the other FIGURES.

It is also to be recognized that the disclosed methods and systems may also directly or indirectly affect the various downhole equipment and tools that may contact the treatment fluids comprising the LNG. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIGS. 1-3.

Provided are methods of enhancing recovery of a hydrocarbon fluid in accordance with the disclosure and the illustrated FIGs. An example method comprises selecting a liquefied natural gas capable of being processed into a modified liquefied natural gas having a desired composition, adjusting the composition of the liquefied natural gas to provide the modified liquefied natural gas with the desired composition, preparing a treatment fluid from the modified liquefied natural gas, introducing the treatment fluid into a wellbore, and contacting the hydrocarbon fluid with the treatment fluid in the wellbore.

Additionally or alternatively, the method may include one or more of the following features individually or in combination. Selecting the liquefied natural gas may further comprise comparing compositions of at least two samples of liquefied natural gases; wherein the at least two samples of liquefied natural gases have different compositions; wherein the comparing further comprises determining which of the at least two samples of liquefied natural gases comprises a lower minimum miscibility pressure if mixed with the hydrocarbon fluid. Adjusting the composition of the liquefied natural gas may further comprise adding a volume of a liquefied natural gas compositional component to the liquefied natural gas; wherein the liquefied natural gas compositional component is selected from the group consisting of methane, ethane, propane, butane, and any combination thereof. The liquefied natural gas may be obtained from natural gas produced from the wellbore. The liquefied natural gas may be obtained from natural gas produced from a nearby wellbore in the same reservoir. The treatment fluid may be miscible with the hydrocarbon fluid to provide a produced hydrocarbon fluid; wherein the method further comprises introducing the produced hydrocarbon fluid into a pipeline without removal of the treatment fluid from the produced hydrocarbon fluid. The treatment fluid may further comprise an aqueous base fluid. The treatment fluid may further comprise a surfactant. The treatment fluid may be foamed.

Provided are methods of enhancing recovery of a hydrocarbon fluid in accordance with the disclosure and the illustrated FIGs. An example method comprises adjusting a composition of a liquefied natural gas to provide a modified liquefied natural gas with the desired composition, preparing a treatment fluid from the modified liquefied natural gas, introducing the treatment fluid into a wellbore, and contacting the hydrocarbon fluid with the treatment fluid in the wellbore.

Additionally or alternatively, the method may include one or more of the following features individually or in combination. Adjusting the composition of the liquefied natural gas may further comprise adding a volume of a liquefied natural gas compositional component to the liquefied natural gas; wherein the liquefied natural gas compositional component is selected from the group consisting of methane, ethane, propane, butane, and any combination thereof. The liquefied natural gas may be obtained from natural gas produced from the wellbore. The liquefied natural gas may be obtained from natural gas produced from a nearby wellbore in the same reservoir. The treatment fluid may be miscible with the hydrocarbon fluid to provide a produced hydrocarbon fluid; wherein the method further comprises introducing the produced hydrocarbon fluid into a pipeline without removal of the treatment fluid from the produced hydrocarbon fluid. The treatment fluid may further comprise an aqueous base fluid. The treatment fluid may further comprise a surfactant. The treatment fluid may be foamed.

Provided are systems for enhancing recovery of a hydrocarbon fluid in accordance with the disclosure and the illustrated FIGs. An example system comprises a treatment fluid comprising: a modified liquefied natural gas having an adjusted composition; wherein the adjusted composition was provided by the addition of a volume of a liquefied natural gas compositional component to a liquefied natural gas; wherein the liquefied natural gas compositional component is selected from the group consisting of methane, ethane, propane, butane, and any combination thereof. The system further comprises pumping equipment capable of pumping the treatment fluid; and mixing equipment capable of mixing the volume of the liquefied natural gas compositional component with the liquefied natural gas to provide the modified liquefied natural gas.

Additionally or alternatively, the system may include one or more of the following features individually or in combination. The treatment fluid may be a fracturing fluid. The treatment fluid may be miscible with the hydrocarbon fluid. The treatment fluid may have a lower miscibility pressure with the hydrocarbon fluid compared to the same treatment fluid produced with the liquefied natural gas instead of the modified liquefied gas. The treatment fluid may be foamed. The treatment fluid may further comprise an aqueous base fluid. The treatment fluid may further comprise a surfactant.

EXAMPLES

The present disclosure may be better understood by reference to the following examples, which are offered by way of illustration. The present disclosure is not limited to the examples provided herein.

Example 1

Figure 4:
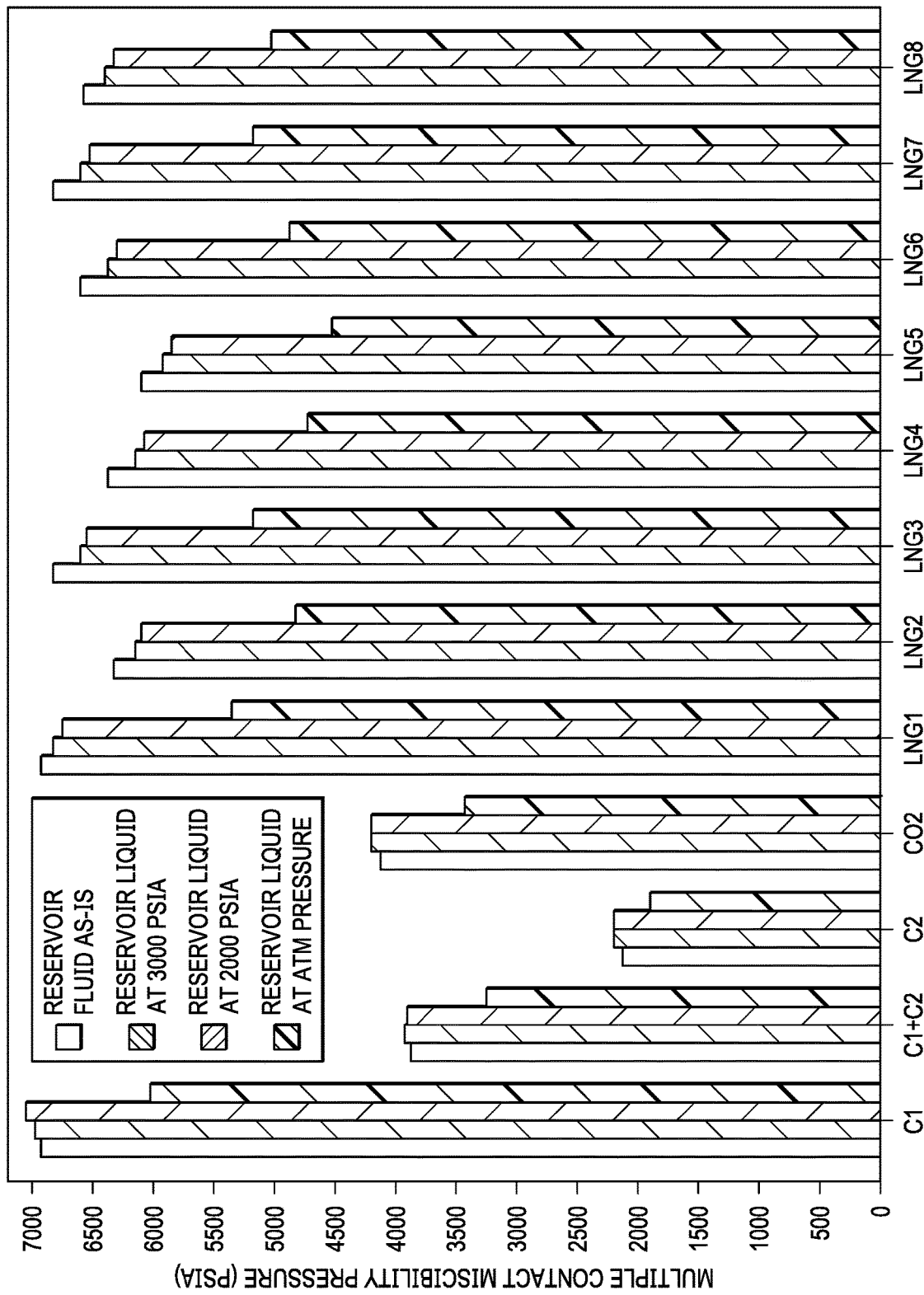
FIG. 4 is a graph illustrating the results of a comparative experiment illustrating the effect of different compositions of liquefied natural gas on the multiple contact miscibility pressure in accordance with one or more examples described herein.

Example 1 illustrates a comparative experiment to test the miscibility of different LNG compositions with a reservoir fluid at different pressures to determine the pressure at which multiple-contact miscibility was achieved. The different LNG compositions are illustrated in Table 1 below. The results are illustrated by FIG. 4.

TABLE 1

| Composition Sample | Methane | Ethane | Propane | Butane | $CO_2$ | Total (%) |
|---|---|---|---|---|---|---|
| C1 | 100 | 0 | 0 | 0 | 0 | 100 |
| C1 + C2 | 50 | 50 | 0 | 0 | 0 | 100 |
| C2 | 0 | 100 | 0 | 0 | 0 | 100 |
| $CO_2$ | 0 | 0 | 0 | 0 | 100 | 100 |
| LNG1 | 93 | 4 | 3 | 0 | 0 | 100 |
| LNG2 | 87 | 8 | 5 | 0 | 0 | 100 |
| LNG3 | 90 | 8 | 2 | 0 | 0 | 100 |
| LNG4 | 87 | 7 | 4 | 2 | 0 | 100 |
| LNG5 | 87 | 4 | 6 | 3 | 0 | 100 |
| LNG6 | 87 | 2 | 4 | 2 | 5 | 100 |
| LNG7 | 88 | 4 | 3 | 0 | 5 | 100 |
| LNG8 | 83 | 4 | 3 | 0 | 10 | 100 |

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method of enhancing recovery of a hydrocarbon fluid, the method comprising:
    obtaining a sample of the hydrocarbon fluid from a subterranean formation,
    modeling the sample with an equation of state,
    selecting a liquefied natural gas capable of being processed into a modified liquefied natural gas,
    adjusting the concentration of methane, ethane, propane, butane, carbon dioxide, or a combination thereof of the liquefied natural gas to provide the modified liquefied natural gas to be miscible with the hydrocarbon fluid based on the modeled sample, preparing a treatment fluid from the modified liquefied natural gas, introducing the treatment fluid into a wellbore, and contacting the hydrocarbon fluid with the treatment fluid in the wellbore; wherein the treatment fluid is miscible with the hydrocarbon fluid to provide a produced hydrocarbon fluid, introducing the produced hydrocarbon fluid into a transport pipeline without removal of the treatment fluid from the produced hydrocarbon fluid.

2. The method of claim 1, wherein the selecting the liquefied natural gas further comprises comparing compositions of at least two samples of liquefied natural gases; wherein the at least two samples of liquefied natural gases have different compositions; wherein the comparing further comprises determining which of the at least two samples of liquefied natural gases comprises a lower minimum miscibility pressure if mixed with the hydrocarbon fluid.

3. The method of claim 1, wherein the adjusting the composition of the liquefied natural gas further comprises adding a volume of methane, ethane, propane, butane, and any combination thereof.

4. The method of claim 1, wherein the liquefied natural gas is obtained from natural gas produced from the wellbore.

5. The method of claim 1, wherein the liquefied natural gas is obtained from natural gas produced from a nearby wellbore in the same reservoir.

6. The method of claim 1, wherein the treatment fluid further comprises an aqueous base fluid.

7. The method of claim 1, wherein the treatment fluid further comprises a surfactant.

8. The method of claim 1, wherein the treatment fluid is foamed.

9. A method of enhancing recovery of a hydrocarbon fluid, the method comprising:

adjusting a composition of a liquefied natural gas to provide a modified liquefied natural gas with the desired composition, wherein the adjusting the composition of the liquefied natural gas further comprises adding a volume of a liquefied natural gas compositional component to the liquefied natural gas; wherein the liquefied natural gas compositional component is selected from the group consisting of methane, ethane, propane, butane, carbon dioxide, and any combination thereof; wherein the composition is adjusted to be miscible with the hydrocarbon fluid, preparing a treatment fluid from the modified liquefied natural gas, introducing the treatment fluid into a wellbore, and contacting the hydrocarbon fluid with the treatment fluid in the wellbore; wherein the treatment fluid is miscible with the hydrocarbon fluid to provide a produced hydrocarbon fluid, introducing the produced hydrocarbon fluid into a transport pipeline without removal of the treatment fluid from the produced hydrocarbon fluid.

10. The method of claim 9, wherein the treatment fluid further comprises an aqueous base fluid.

11. The method of claim 9, wherein the treatment fluid further comprises a surfactant.

12. The method of claim 9, wherein the treatment fluid is foamed.

13. The method of claim 9, wherein the liquefied natural gas is obtained from natural gas produced from the wellbore.

14. The method of claim 9, wherein the liquefied natural gas is obtained from natural gas produced from a nearby wellbore in the same reservoir.

15. The method of claim 9, wherein the treatment fluid is a fracturing fluid.

16. The method of claim 9, wherein the treatment fluid has a lower miscibility pressure with the hydrocarbon fluid compared to the same treatment fluid produced with the liquefied natural gas instead of the modified liquefied gas.

17. A system for enhancing recovery of a hydrocarbon fluid from a wellsite, the system comprising:

a treatment fluid comprising:
a modified liquefied natural gas having an adjusted composition; wherein the adjusted composition was provided by the addition of a volume of a liquefied natural gas compositional component to a liquefied natural gas; wherein the liquefied natural gas compositional component is selected from the group consisting of methane, ethane, propane, butane, and any combination thereof; wherein the modified liquefied natural gas is miscible with the hydrocarbon fluid;

pumping equipment capable of pumping the treatment fluid;

mixing equipment capable of mixing the volume of the liquefied natural gas compositional component with the liquefied natural gas to provide the modified liquefied natural gas; and a transport pipeline to convey the modified liquefied natural gas away from the wellsite after it has become miscible with the hydrocarbon fluid.

18. The system of claim 17, wherein the treatment fluid is a fracturing fluid.

19. The system of claim 17, wherein the treatment fluid has a lower miscibility pressure with the hydrocarbon fluid compared to the same treatment fluid produced with the liquefied natural gas instead of the modified liquefied gas.

20. The system of claim 17, wherein the treatment fluid is foamed.

* * * * *